Nov. 29, 1927.  
C. E. JOHNSON  
1,650,795  
BIMETALLIC ROTOR FOR INDUCTION MOTORS  
Filed Dec. 16, 1924  
2 Sheets-Sheet 1

INVENTOR  
CARL E. JOHNSON  
BY  
ATTORNEY

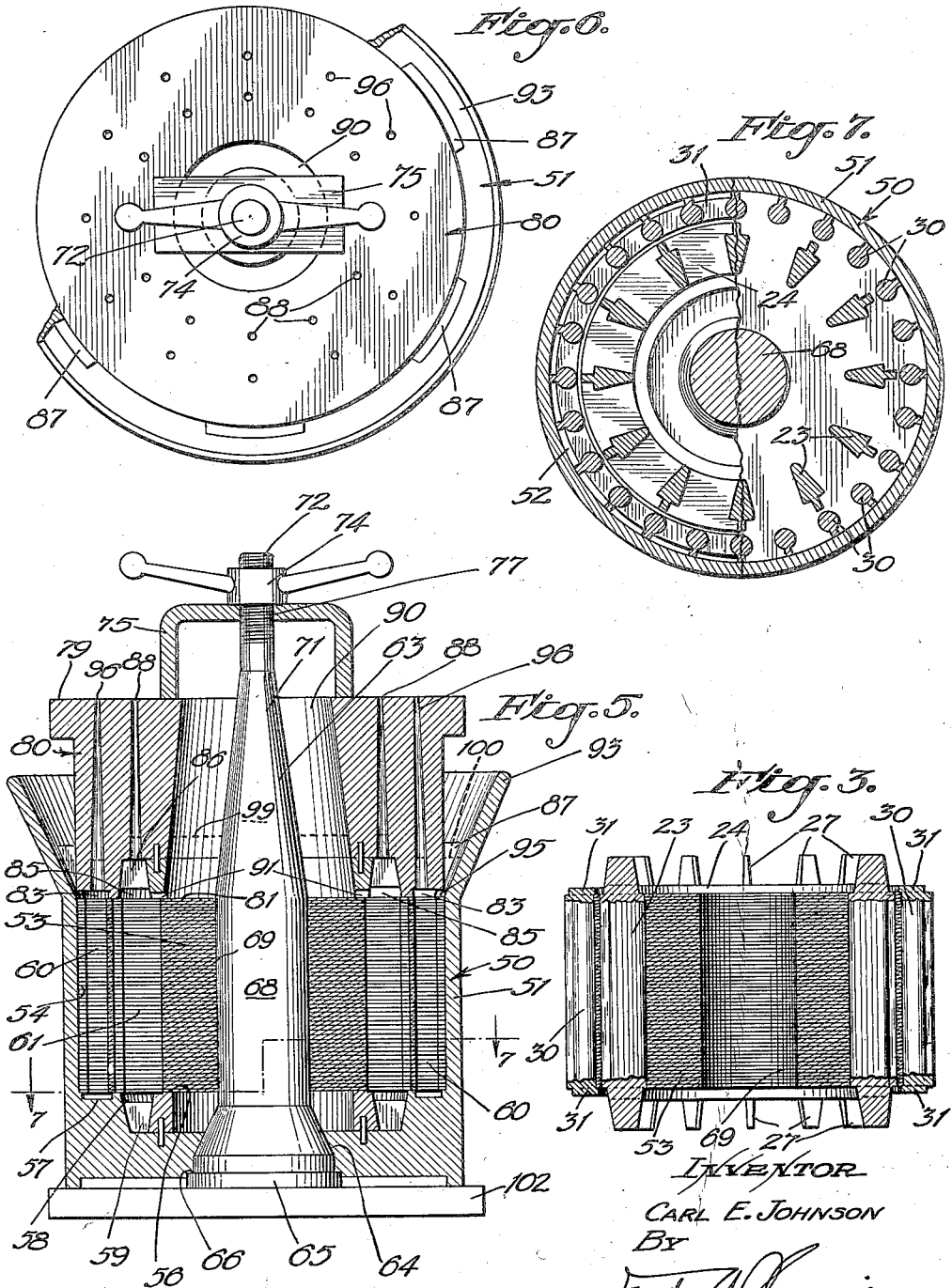

Patented Nov. 29, 1927.

1,650,795

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, A CORPORATION OF CALIFORNIA.

BIMETALLIC ROTOR FOR INDUCTION MOTORS.

Application filed December 16, 1924. Serial No. 756,225.

This invention relates to electric motors, and more particularly to induction motors.

An induction motor consists of a stator and a rotor. The stator comprises a laminated magnetic metal body which is rigidly secured in a frame. A primary winding is carried in the magnetic body, this winding being connected with a multiphase electricity source. The rotor generally comprises a shaft having a secondary magnetic laminated body carried concentrically on the shaft, this body being arranged to rotate inside the stator. Secondary windings are carried by the secondary magnetic body. The secondary windings may be in the form of wires, or in squirrel-cage motors they may be in the form of axial conductor bars connected by end rings. The conductor bars extend through the secondary magnetic body parallel to the shaft and in circular arrangement therearound. End rings are secured at the ends of the conductor bars for the purpose of completing conducting paths for the currents induced in the bars. The squirrel-cage, which comprises the conductor bars and end rings, is made of a very low resistance so as to increase the efficiency of the motor. When a current flows through the primary winding, a revolving field is set up which rotates the rotor.

The present induction motors require the use of compensators or starting devices for starting the motor in order to prevent a burning out of the secondary winding of the rotor in starting. If full line voltage be impressed on an induction motor with its rotor stationary, high current flows in the primary and a similarly heavy current is induced in the secondary winding because of the very low resistance thereof which may result in a burning out of the primary and secondary windings. After the rotor is revolving, however, the full voltage of the line may be impressed upon the primary coils without danger of burning out either winding.

It is an object of the invention to provide an induction motor which may be started without the use of a starting device or compensator of any kind. To accomplish this, I provide a motor which will not draw an excessive current during the starting thereof. I provide a rotor which has a main winding and an auxiliary winding. The main winding is of a low resistance and the auxiliary winding is of a high resistance.

It is another object of the invention to provide a main winding which is made of a low resistance metal and an auxiliary winding which is made of a high resistance metal. By so doing, it is possible to make both of the windings of a large cross section, and consequently provide an extensive heat dissipating area.

Induction motors of the squirrel type include a rotor which is comprised of laminations having a central opening through which a shaft is extended and having a series of openings disposed in circular arrangement around the axis of the laminations. Conductor bars are extended through these openings, and end rings are secured at each end of the conductor bars providing complete conducting paths. The ends of the conductor bars are generally turned down to a reduced diameter and extended through holes formed in the end rings, the bars being subsequently sweated to the ring and riveted over to provide a good electrical contact therebetween. This method of providing a squirrel-cage takes considerable time, first, in the machine work on the conductor bars and rings, and second, in the installation of the bars and rings. There is a tendency for the joints between the bars and the rings to loosen, thus producing a defective rotor.

It is a further object of the invention to provide a rotor having integral conductor bars and end rings. I accomplish this by casting the bars and rings simultaneously. This eliminates all joints between the squirrel-cage parts, and eliminates any defect therein. By casting the conductor bars and end rings, I eliminate practically all machining and reduce the cost of the rotor.

It is also an object of the invention to provide a cast squirrel-cage motor of this character having main windings and auxiliary windings which are made of materials of different specific resistances, both of which windings are cast.

It is a further object of the invention to provide a process for producing the conductor bars and end rings of a squirrel-cage rotor.

The form of my invention, shown in the drawings, comprises a laminated magnetic core which is cylindrical in shape and is mounted on a rotatable shaft. Main winding conductor bars are extended through the core parallel to the shaft and in circular arrangement therearound. Main winding end rings are formed integrally at each end of the main winding conductor bars for short-circuiting them. These main winding conductor bars and main winding end rings are made of a low resistance material and are fairly large in cross section. Also extending through the laminated magnetic core are auxiliary winding conductor bars, these auxiliary winding conductor bars being extended through the core parallel to the shaft and in circular arrangement with respect to the axis of the core. Auxiliary winding end rings are formed integrally at each end of the auxiliary winding conductor bars. The auxiliary winding conductor bars and the auxiliary winding end rings are made of a material having a comparatively high specific resistance. The auxiliary winding conductor bars and the auxiliary winding end rings are made of a large area of cross sections. My rotor having these characteristics is made in a novel mold of my invention which is set forth in my patent entitled Mold for bi-metallic rotor, No. 1,603,545, issued October 28, 1926. The magnetic core laminations are placed in the body of the mold and compressed tightly together. A low resistance material is then poured to form the main winding of the lower, and high resistance material is poured to form the auxiliary winding of the rotor.

Other objects and advantages of the invention will be made evident hereinafter.

Referring to the two sheets of drawings which are for illustrative purposes only, Fig. 1 is a fragmentary sectional view showing an induction motor including the features of my invention.

Fig. 2 is an end view of a rotor having the features of my invention.

Fig. 3 is a longitudinal cross section through a rotor of my invention.

Fig. 5 is a vertical sectional view showing the rotor of my invention in the process of making.

Fig. 6 is a plan view of Fig. 5.

Fig. 7 is a sectional view taken as indicated by the line 7—7 of Fig. 5.

Figure 1:
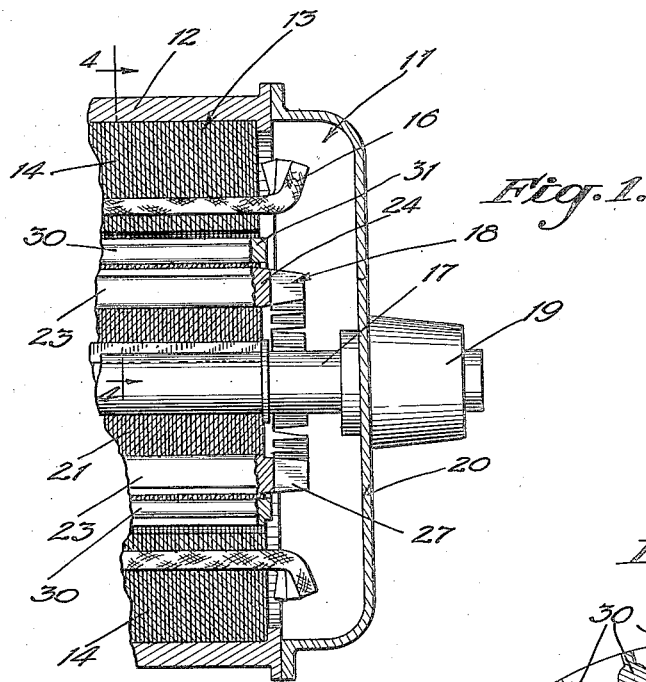
Figure 4:
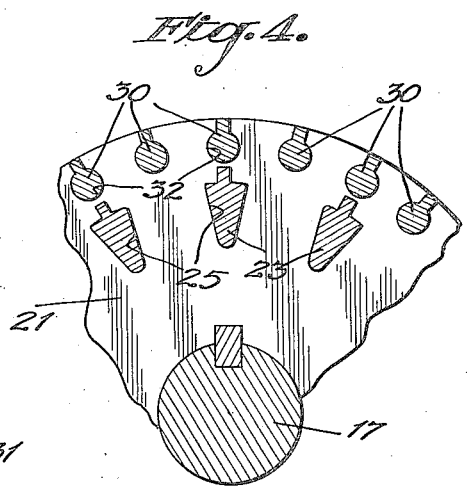
Fig. 4 is a sectional view of a portion of a rotor taken substantially as indicated by the line 4—4 of Fig. 1.
Figure 2:
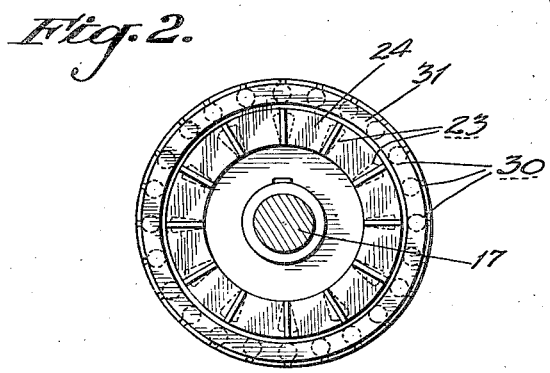

As shown in Fig. 1 of the drawings, 11 represents an induction motor having a frame 12 in which a stator 13 is rigidly secured. The stator 13 comprises a primary magnetic body 14 which is comprised of laminations, as shown. A primary winding 16 is extended through openings in the primary magnetic body 14, this primary winding 16 being connected with a multiphase electric source, not shown. When current is supplied to the winding 16 from the multiphase source, a revolving field is set up by the stator 13.

A shaft 17 of a rotor 18 journals in bearings 19 carried by a bracket 20, which bracket 20 is secured to the frame 12 of the motor. A secondary cylindrical magnetic body or core 21 is carried by the shaft 17, this core 21 being comprised of a multiplicity of laminations, as shown. A main winding for the rotor 18 is provided in the form of main conductor bars 23 and main end rings 24. As shown in Figs. 1, 2, 3 and 4, the main conductor bars extend through openings 25 provided through the core 21, these openings extending parallel to the shaft 17 and being arranged in circular formation therearound. The end rings 24 are preferably formed integrally with the conductor bars 23 and have air circulating fins or impellers 27 which set up a circulation through the motor, when the rotor is turning, for the purpose of cooling the various windings. The main winding comprising the bars 23 and rings 24 is made of low resistance material and has a large area of cross section. The low resistance of the winding contributes to the efficiency of the motor and the large area of cross section contributes to the heat dissipating qualities thereof. An auxiliary winding is provided for the rotor 18 in the form of auxiliary conductor bars 20 and auxiliary end rings 31. The auxiliary conductor bars 30 extend through openings 32 provided in the core 21, which openings 32 extend parallel to the axis of rotation of the rotor 18 and are in circular arrangement therearound. The end rings 31 are preferably provided integral with the conductor bars 30. The auxiliary conductor bars 30 and the auxiliary end rings 31 are made of a material of comparatively high specific resistance. The use of a high resistance material permits the auxiliary winding to have a large area of cross section. This contributes to the heat dissipating qualities of the winding and also contributes to the convenience of making the winding.

When the multiphase current is supplied to the primary winding 16, a rotating field is created which revolves the rotor 18. In ordinary squirrel-cage motors, compensators or starting devices are necessary so that an excessive current will not be drawn through the motor during the starting thereof in order to prevent a burning out of the windings. In a motor of my invention I eliminate the use of any starting device or compensator by providing the auxiliary winding 30 which is of a comparatively high resistance. The auxiliary winding comprised of the auxiliary conductor bars 30 and the end rings 31 is effective in preventing the motor from consuming an excessive current during the starting thereof and in preventing a burning out of either of the windings.

It is a well known fact that the frequency of the flux in the rotor is proportional to the slip, being high when the rotor is stationary and low as it approaches synchronous speed. By so proportioning the rotor as to give a high reactance in the main winding, I am able while the rotor is stationary to cut the current in this main winding to a very low value. The auxiliary winding, during this period, furnishes the necessary starting torque. As the rotor accelerates, the flux and the electromotive force induced in the main winding are reduced in frequency; and the effect of the high reactance diminishes, the current in the main winding gradually increasing and the torque resulting therefrom also increasing until at normal speed the main winding furnishes the greater portion of the driving torque.

I have stated that by the use of high resistance metal in the auxiliary winding, I am able to use a large cross section of metal therein. This cross section for a given length of bar is inversely proportional to the resistance, so that the resistance and consequently the current flowing can be readily controlled by varying the cross section of the bar.

In actual design of the motors, it is usual to figure on a certain starting current in the primary winding, and to so design the motor that this current will not be exceeded. In some cases the minimum cross section of the bars of the auxiliary winding are fixed by mechanical or other considerations. In such cases by using high resistance material in these bars, I am able to produce a motor having a very low starting current. It may, therefore, be said that one of the main advantages of my invention is that I am able in many cases to produce a motor which is otherwise quite similar in performance to existing motors, but which has very low starting current.

In my application presented to the Patent Office entitled Rotor for induction motors, filed July 8, 1924, Serial No. 724,800, I show a main and auxiliary winding for a rotor which are of low and high resistances, respectively. In that disclosure, however, I use a low resistance material of large area of cross section for the main or low resistance winding, and a low resistance material of small cross section for the auxiliary or high resistance winding. The making of the auxiliary winding of a small cross section produces a tendency for an overheating of the winding. The forms of windings in this application will not heat readily owing to the fact that the areas of cross section are very large, it being possible to provide large cross sections by the use of materials having high and low specific resistances.

In Figs. 5, 6 and 7 I illustrate the process of making the rotor, just described, and show the apparatus employed therefor. As shown in these figures, I employ a mold which has a body 50. This body 50 provides a cylindrical wall 51 which forms a lamination receiving chamber 52. Laminations 53 are placed in the chamber 52, the peripheries of these laminations 53 being of substantially the same size as the inner cylindrical face 54 of the wall 51. A radial annular face 56 is provided at the lower end of the cylindrical face 54, against which face 56 the lowermost of the laminations 53 rests. A lower outer annular channel 57 and an inner annular ring channel 58 are provided in the face 56, as shown clearly in Fig. 5. The body 50 is recessed so as to provide a series of wing slots 59 which connect with the inner annular ring channel 58, as shown. The laminations 53 are provided with a series of outer conductor bar openings 60 which extend parallel to the axis of the laminations 53, and which are arranged in circular disposal therearound, these outer openings 60 coinciding with the outer ring slot 57. Inner conductor bar openings 61 are provided in the laminations 53 which are in circular arrangement and coincide with the inner ring channel 58.

A mandrel 63 is extended upward through an opening 64 in the lower part of the body 50. The head 65 of the mandrel 63 engages with a shoulder 66 of the body 50. A cylindrical portion 68 of the mandrel 63 extends through central openings 69 in the laminations 53. The mandrel 63 is tapered at 71 and the extreme upper end 72 is threaded to receive a handled nut 74. A yoke 75 is arranged below the nut 74, the portion 72 of the mandrel 63, extending through an opening 77 in the yoke 75. When the nut 74 is screwed downward on the threaded portion 72, the yoke 75 is forced against an upper face 79 of a cap 80. This forces a lower radial wall 81 of the cap 80 against the uppermost of the laminations 53, compressing them tightly in the body 50. The cap 80 is provided with an outer annular ring channel 83 which is provided in the wall 81 and which coincides with the outer conductor bar openings 60, as shown. An inner ring channel 85 is provided in the wall 81, this ring channel 85 coinciding with inner conductor bar openings 61, as shown. Wing slots 86 are provided in the cap 80 which connect with the inner ring channel 85. The cap 80 is guided into the upper end of the lamination receiving chamber 52 by means of centralizing lugs 87 which are spaced around the circumference of the chamber 52 slightly thereabove, as shown. Metal is poured into the ring channels 58 and 85, the wing slots 59 and 86 and the conductor bar openings 61 through a pouring opening 90 formed in the cap 80, this pouring opening 90 connecting with the inner ring channel 85 through passages 91. A pouring portion in the form of a bell 93 is provided at the upper end of the body 50, this pouring portion connecting with the outer ring channel 83 through ducts 95, the metal entering through these ducts filling the channels 57 and 83, and the conductor bar openings 60. Risers 96 are provided in the cap 80 for the escape of gas from the channel 83 and risers 88 are provided in the cap for the escape of gas from the channels 85 through the slots 86.

After the laminations 53 have been placed in the lamination receiving chamber 52, the cap 85 is placed as shown, and laminations are rigidly clamped in place by means of the mandrel 63, the handled nut 74 and the yoke 75. The mold is then placed in a suitable preheating furnace and preheated to a desirable temperature. The mold is removed from the preheating furnace, and a melted metal is poured through the central pouring opening 90 of the cap 80, this metal flowing through the passages 91 into the ring channel 85. The metal flows also through the inner conductor bar opening 61 into the ring channel 58, filling the wing slots 59. The metal is poured to a level, as indicated by the dotted line 99, completely filling the wing slots 86. As the metal cools and slightly shrinks, it may be followed up with a little more metal to compensate for this shrinkage. Other melted metal is similarly poured into the bell 93, this metal passing through the ducts 95 into the ring channel 85, the conductor bar openings 60 and the ring channel 57, the metal being poured to a level 100. Any gas which forms in the mold may readily pass out through the risers 96 or 98. When the pouring is completed, the mold is allowed to cool in a suitable manner. To successfully produce a perfect rotor, it is necessary to faithfully conform to certain regulations. The mold must be preheated to a fairly accurate temperature; if not, the rings, when the rotor is taken out of the mold, will be found to be checked. It is also important that the temperature of the metal being poured be at a certain temperature. The job after it is poured should also be cooled in a proper manner. It should be allowed to cool slowly and gradually so that the conductor bars and the end rings will cool substantially the same. It has been found that if the metal cools too rapidly, the end rings will cool off faster than the conductor bars and will contract in such a manner that the metal is likely to crack. It is desirable to place the mold on a suitable vibrator or shaker, as indicated at 102 in Fig. 5, during the pouring and immediately thereafter so that the gases may be thoroughly released from the mold and blow-holes will be eliminated.

After the rotor has properly cooled, it is removed from the mold by unscrewing the nut 74 from the mandrel 63 and removing the yoke 75 and the cap 80 from place, the mandrel 63 also being removed from place. From Fig. 5, it will be seen that all of the faces of the mold exposed to contact with poured metal are formed with sufficient draft so that all of the parts may readily be removed from place. After the rotor is removed from the mold, it is necessary to cut off the short portions which form at the risers, and to cut the metal at the passages 91 and the ducts 95, this being the only machine-work necessary to the entire production of the rotor.

The pouring opening 90 may be poured with a low resistance material and the pouring bell 93 may be poured with a high resistance material, thus forming the two windings from materials having different resistances.

By inspection of Fig. 3 it will be seen that the conductor bars 23 and 30 are provided integrally with the end rings 24 and 31. The impeller blades 27 are also formed when the metal is cast.

By using metals of different specific resistances, it is possible to provide both the main and the auxiliary windings with a large area of cross section. This contributes to the convenience with which these windings may be cast. The surfaces of the windings are very smooth, and an accurate job is produced which requires no machining aside from that of removing the risers and separating the metal at the passages 91 and the ducts 95.

I claim as my invention:

1. A method for producing a laminated rotor of the squirrel-cage type having two series of conductor bars joined by opposite end rings, which comprises: clamping the laminations together; heating said laminations; and separately casting each series of conductor bars and associated end rings of different metals while the laminations are so preheated.

2. A method of casting a multiple squirrel-cage winding on a magnetic core of an induction motor having two series of substantially longitudinally extending, conductor-receiving openings therethrough, which comprises: heating said core; holding said core stationary in a suitable mold; and pouring different metals separately into each respective series of openings while the core is so preheated.

3. A method of casting two windings of different metals in a squirrel cage rotor core having conductor openings therein for each of said windings which consists in mounting said core in a suitable mold and directing molten streams of said metals into said openings so that said metals do not mix.

4. A method of casting two windings of different metals in a squirrel cage rotor core having conductor openings therein for each of said windings which consists in mounting said core in a suitable mold and directing molten streams of said metals into said openings and cooling said rotor relatively slowly.

5. A method of casting two windings of different metals in a squirrel cage rotor core having conductor openings therein for each of said windings which consists in mounting said core in a suitable mold, directing a molten stream of one of said metals into said openings nearest the axis of said core and directing a molten stream of the other of said metals into said openings nearest the periphery of said core.

6. A method of casting two windings of different metals in a squirrel cage rotor core having conductor openings therein for each of said windings which consists in mounting said core in a suitable mold and simultaneously directing molten streams of said metals into said openings so that said metals do not mix.

7. A method of casting two windings of differential metals in a squirrel cage rotor core having conductor openings therein for each of said windings which consists in mounting said core in a suitable mold and simultaneously directing molten streams of said metals into said openings and cooling said rotor relatively slowly.

8. A method of casting two windings of different metals in a squirrel cage rotor core having conductor openings therein for each of said windings which consists in mounting said core in a suitable mold, directing a molten stream of one of said metals into said openings nearest the axis of said core and simultaneously directing a molten stream of the other of said metals into said openings nearest the periphery of said core.

In testimony whereof, I have hereunto set my hand at Los Angeles, California, this 8th day of December, 1924.

CARL E. JOHNSON.